US006792492B1

(12) United States Patent
Griffin

(10) Patent No.: US 6,792,492 B1
(45) Date of Patent: Sep. 14, 2004

(54) SYSTEM AND METHOD OF LOWERING OVERHEAD AND LATENCY NEEDED TO SERVICE OPERATING SYSTEM INTERRUPTS

(75) Inventor: Clyde Griffin, Mapleton, UT (US)

(73) Assignee: Novell, Inc., Provo, UT (US)

( * ) Notice: Subject to any disclaimer, the term of this patent is extended or adjusted under 35 U.S.C. 154(b) by 538 days.

(21) Appl. No.: 09/832,769

(22) Filed: Apr. 11, 2001

(51) Int. Cl.[7] ............................................. G06F 13/24
(52) U.S. Cl. ....................... 710/262; 710/260; 710/263; 710/264
(58) Field of Search ................................ 710/260, 262, 710/263, 264, 47

(56) References Cited

U.S. PATENT DOCUMENTS

| | | | | |
|---|---|---|---|---|
| 5,438,677 A | * | 8/1995 | Adams et al. | 710/263 |
| 5,727,227 A | * | 3/1998 | Schmidt et al. | 712/36 |
| 5,928,321 A | * | 7/1999 | Ozcelik et al. | 709/1 |
| 6,021,458 A | * | 2/2000 | Jayakumar et al. | 710/266 |
| 6,163,829 A | * | 12/2000 | Greim et al. | 710/260 |

* cited by examiner

Primary Examiner—Mark H. Rinehart
Assistant Examiner—Thomas J. Cleary
(74) Attorney, Agent, or Firm—Haynes and Boone, LLP

(57) ABSTRACT

A method for achieving low overhead for operating system ("OS") interrupts is described. In a preferred embodiment, when an interrupt occurs, a lightweight interrupt handler is used to acknowledge that the interrupt occurred, prevent the CPU and the OS from fully servicing the interrupt until a designated future time, set a CPU flag indicating that the interrupt has been received, and return from the lightweight interrupt handler. In this manner, the interrupt is partially acknowledged by the CPU and the OS, but the driver that caused the interrupt is still awaiting service. To achieve low latency, a heavyweight ("non-deferrable") time-based interrupt that flushes all deferred interrupts is scheduled to occur within a specified time. At a later time, when drivers would normally be polled for work, the CPU flag is checked to see if there is interrupt work. If so, with all interrupts disabled at the CPU, the pending interrupt vectors are unmasked to determine which ones need to be serviced. In one embodiment, this is accomplished by examining a special register in the CPU designated for this purpose. Subsequently, the deferred interrupts are batch processed sequentially by calling their service routines without any context save required.

25 Claims, 3 Drawing Sheets

SYSTEM AND METHOD OF LOWERING OVERHEAD AND LATENCY NEEDED TO SERVICE OPERATING SYSTEM INTERRUPTS

BACKGROUND OF THE INVENTION

The present invention relates generally to servicing of interrupts by an operating system ("OS"), and more particularly, to a method of achieving low overhead and low latency for OS interrupts.

On the majority of computer hardware systems hosting commercial operating systems, devices exist whose function it is to generate hardware interrupts to signal the occurrence of asynchronous events such as a packet arriving on a wire for a network interface card ("NIC") or an event signaling the completion of a disk I/O request. The handling of these kinds of asynchronous events has traditionally been accomplished in one of two ways, including polling and interrupt-driven. Each of these methods has advantages, as well as disadvantages.

In particular, with regard to interrupt-driven handling of asynchronous events, during normal operation, when a device on an I/O bus, such as a storage device, NIC, or I/O device, has work that needs to be done, it asserts an interrupt to the processor. If interrupts are enabled at the processor, receipt of an interrupt causes the processor to enter a special state to service the interrupt. First, the processor must save context, which means saving the state of the registers to memory so the processor can use the registers during handling of the interrupt without destroying the state of the interrupted process. The processor then vectors to a designated location in memory and runs an interrupt service routine, or interrupt handler to service the interrupt, after which the state, or context, is restored and a return from interrupt is executed. The processor then continues executing from the position in the code at which it was interrupted.

In today's computing environment, the bit rate of a packet on the wire is steadily increasing. Hardware will traditionally deliver one interrupt to the OS for each packet of information received on the wire. As the transfer rate increases, the amount of interrupt processing required by the CPU also increases, reducing the amount of processing that can be performed by the CPU for other purposes. Interrupts are inherently inefficient, as they require some state of the interrupted process to be saved before interrupt handling can begin. This state must later be restored when interrupt handling is completed. This saving and restoring on each interrupt is a waste of CPU cycles. This problem is only compounded as the number of interrupts increases in the system.

On Intel's 32-bit architecture, the context to be saved is small, and therefore interrupt-driven drivers are not a serious problem. However, Intel's new 64-bit architecture requires a significant amount of information to be saved and restored each time an interrupt is taken. This enormous expense is not tolerable for a highly performant OS. On the other hand, the advantage of using an interrupt-driven method is that there is almost no latency between the occurrence of the asynchronous event and the time in which the OS services that event.

In contrast, in the polling mechanism, the OS informs the hardware devices to not generate interrupts. Instead, the OS will poll the devices' drivers at regular intervals to determine whether there is work that needs to be performed. This method clearly has the advantage of completely avoiding the costly overhead of interrupt-driven drivers; however, it suffers from two notable deficiencies. First, the OS must constantly be polling the drivers to determine whether there is work to be done. This act itself is a waste of the CPU's processing time and should be avoided. Secondly, there is some latency between the time the driver would have normally interrupted processing and the time the OS actually polls the device. This latency, if too great, can also result in unacceptable performance.

Therefore, what is needed is a method of handling asynchronous events in a manner that results in both lower latency and lower overhead than the aforementioned traditional methods of handling the same.

SUMMARY OF THE INVENTION

In one embodiment, a system and method of method for achieving low overhead and latency in servicing operating system ("OS") interrupts takes advantage of the availability of a "lightweight interrupt" available on various processors, including a 64-bit processor commercially available from Intel Corporation of Santa Clara, Calif., as "Itanium" (hereinafter "IA-64"). In a preferred embodiment, when a deferrable interrupt occurs, a lightweight interrupt handler, in combination with banked and special control registers, is used to inform the OS that an interrupt occurred and prevent the CPU and associated hardware from fully acknowledging or servicing the interrupt from a hardware standpoint until a designated future time. The OS sets to TRUE a per CPU software flag, referred to as a "Deferred_Interrupt_Pending" flag, indicating that an interrupt has been received but is still pending. A return from the lightweight interrupt handler is then executed. In this manner, the interrupt is partially acknowledged by the CPU, but the device that caused the interrupt is still awaiting service; i.e., from the device's point of view, the interrupt remains pending. To guarantee low latency, a heavyweight ("non-deferrable"), time-based interrupt that flushes all deferrable interrupts is scheduled to occur within a specified time.

At a later time, for example, when drivers would normally be polled for work, the per CPU Deferred_Interrupt_Pending flag is checked to see if there is interrupt work to be performed. If so, with all interrupts disabled at the CPU, the pending interrupts are unmasked to determine which ones need to be serviced. In one embodiment, this is accomplished by, examining a special register in the CPU designated for this purpose. Subsequently, the deferred interrupts are batch processed sequentially by calling their service routines in order of priority without any context save required.

A technical advantage achieved with the invention is that it incorporates the most desirable attributes (low latency, low overhead), while avoiding the undesirable aspects (high latency, high overhead), of both interrupt-driven and polled driver architectures.

DESCRIPTION OF THE PREFERRED EMBODIMENT

Figure 1:
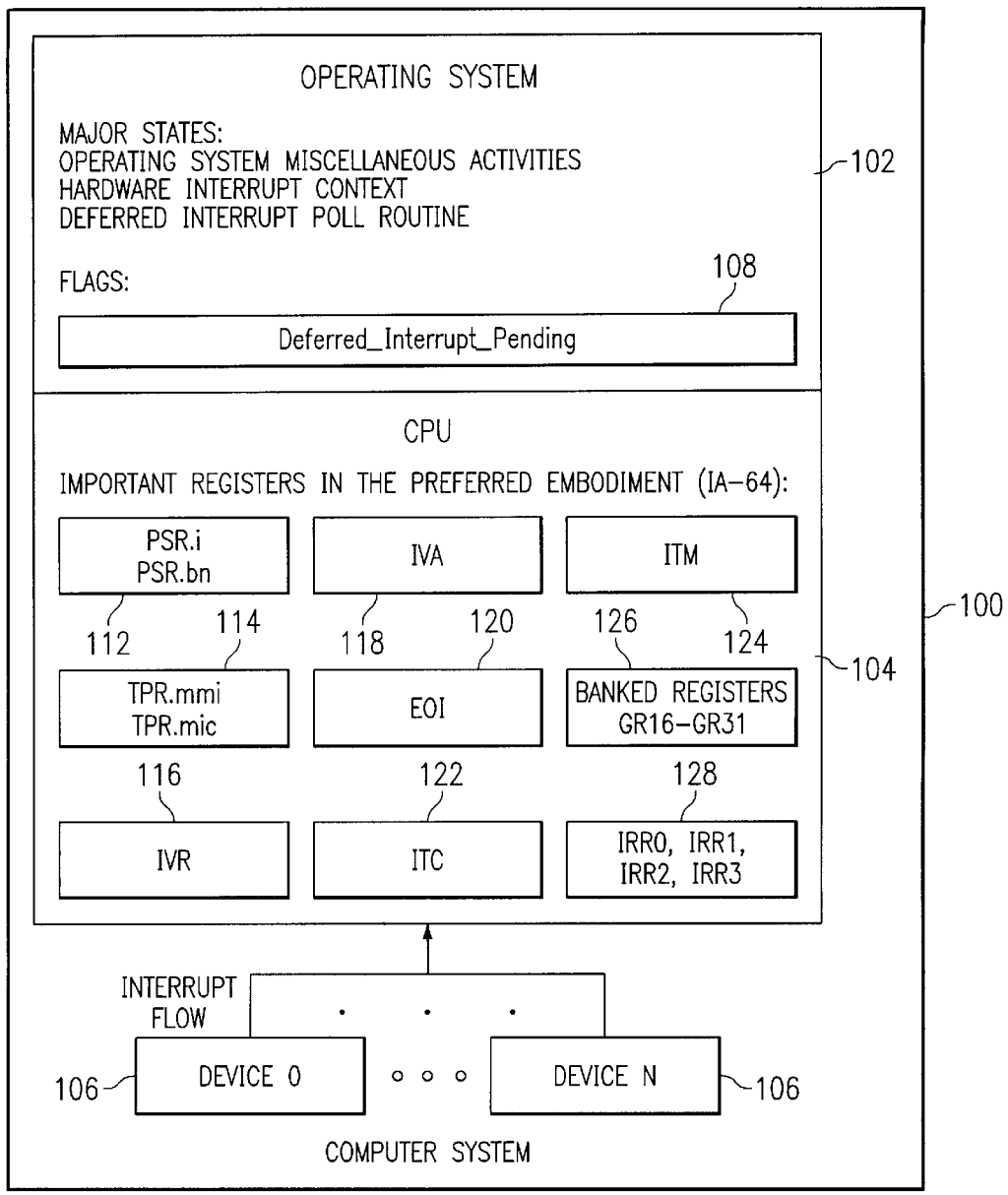
FIG. 1 is a system block diagram of a processing environment for implementing a preferred embodiment of the invention.

FIG. 1 illustrates a portion of a computer system 100 embodying features of a preferred embodiment. The computer system 100 includes an operating system ("OS") 102 comprising instructions executed by a CPU 104. A plurality of devices 106 individually generate interrupts to the CPU 104 when the corresponding device has work to be performed by the CPU. As will be described in detail below, for purposes of the preferred embodiment, the OS 102 operates in three main states, including an Operating System Miscellaneous Activities state, a Hardware Interrupt Context state, and a Deferred Interrupt Poll Routine state. In addition, the OS 102 includes a per CPU Deferred_Interrupt_Pending flag 108, the purpose and function of which will be described in greater detail below.

In a preferred embodiment, and for the purposes of example, the CPU 104 comprises an IA-64, although it will be recognized that other types of processors may be used and the following description of the preferred embodiment with reference to the IA-64 is not intended to limit application of the invention to that particular architecture. The CPU 104 includes a plurality of important registers, including a PSR.i/PSR.bn register 112, a TPR.mmi/TPR.mic register 114, a an IVR register 116, an IVA register 118, an EOI register 120, an ITC register 122, an ITM register 124, a plurality of banked registers GR16–GR31, collectively designated by a reference numeral 126, and four interrupt request registers IRR0–IRR3, collectively designated by a reference numeral 128.

Figure 2:
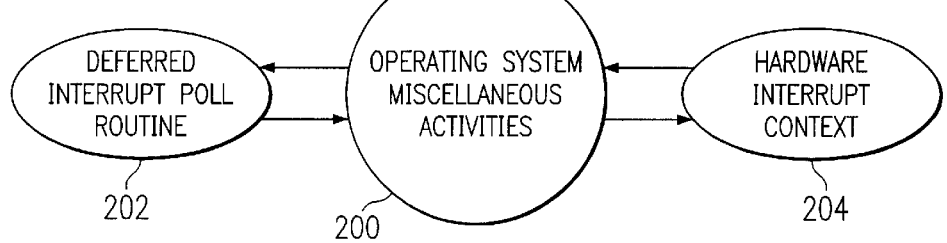
FIG. 2 is a high level state diagram of a preferred embodiment of the invention.

FIG. 2 illustrates a high level state diagram of a preferred embodiment of the present invention for servicing OS interrupts. As shown in FIG. 2, the CPU 104 begins, for purposes of example, in first state 200, designated "Operating System Miscellaneous Activities". As will be described in greater details in FIGS. 3–5, the CPU 104 transitions between this first state 200 and second and third states 202, 204, respectively designated "Deferred Interrupt Poll routine" and "Hardware Interrupt Context".

Figure 3:
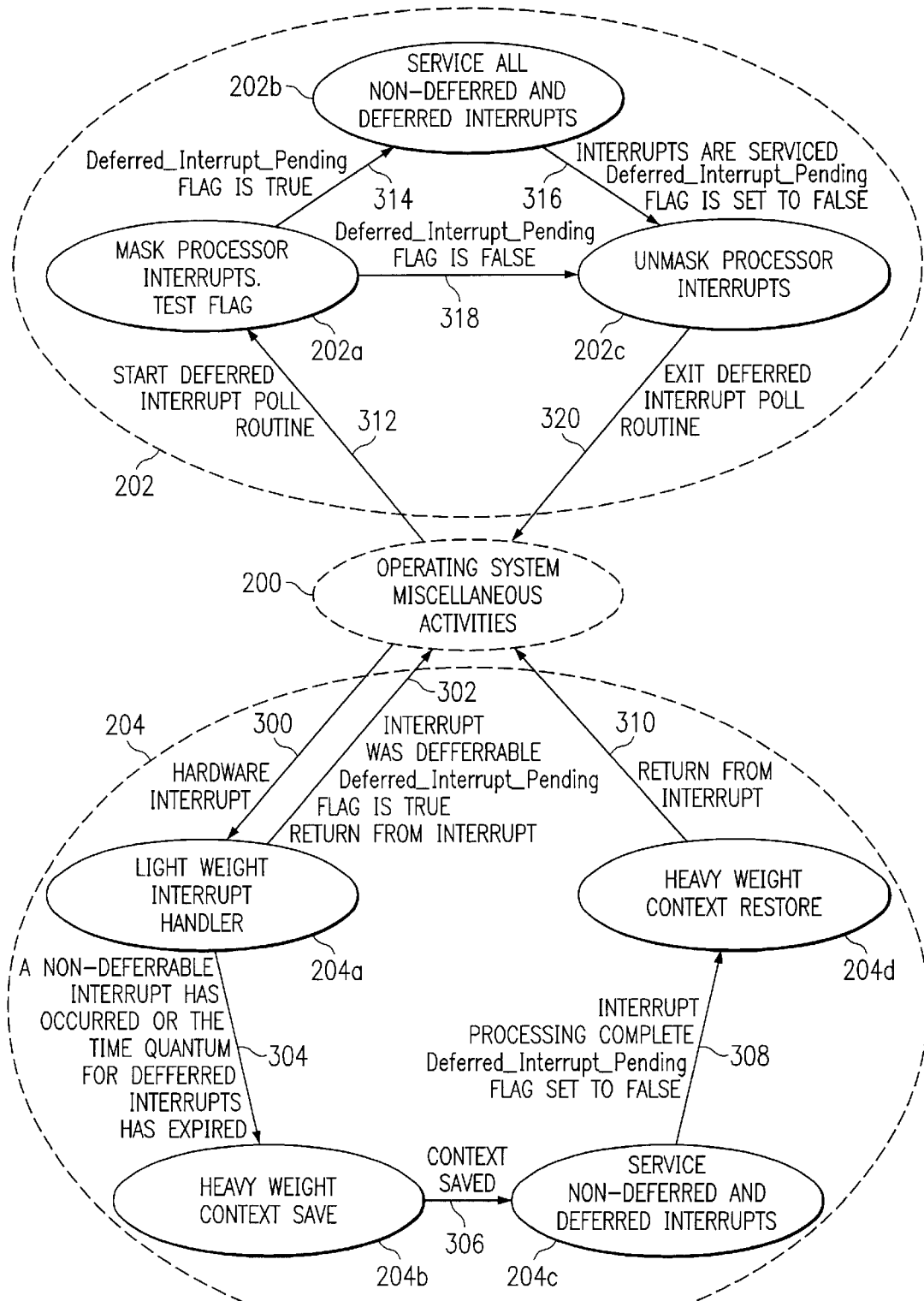
FIG. 3 is a more detailed state diagram of a preferred embodiment of the invention.

FIG. 3 illustrates a more detailed state diagram of the preferred embodiment of the present invention for servicing OS interrupts illustrated in FIG. 2. In particular, FIG. 3 illustrates several "sub-states" of the second and third states 202, 204. Beginning in the Operating System Miscellaneous Activities state 200, receipt of a hardware interrupt causes a transition 300 to a "Lightweight Interrupt Handler" sub-state 204a. The lightweight interrupt is supported on IA-64 by the presence of an interrupt vector table pointed to by the CPU IVA register 118, a series of general scratch registers, in this case, banked registers GR16–GR31 126 and the PRS.bn register 112, which is used to manually switch between banks 0 and 1 for banked registers GR16–GR31 126. From this sub-state 204a, if the hardware interrupt is determined to be deferrable by examining the interrupt request registers IRR0–IRR3 128, the deferrable interrupts are held pending by a modification to the TPR.mic register 114, the Deferred_Interrupt_Pending flag 108 is set to TRUE, and a transition 302 is made back to the Operating System Miscellaneous Activities state 200 responsive to a return from interrupt. If, however, the hardware interrupt is determined to be non-deferrable, a transition 304 is made to a "Heavyweight Context Save" substate 204b. Transition 304 may also occur if a time quantum determined by the OS scheduler, for previously deferred interrupts, has expired. Expiration of this time quantum may be determined by a number of methods, including, for example, the OS examining the contents of the IA-64 timer registers ITC register 122 and the ITM register 124. Ensuring that previously deferred interrupts are not held pending longer than the prescribed time quantum guarantees an overall low latency for interrupt processing. Once the context is saved in a conventional fashion, a transition 306 is made to a "Service All Non-Deferred and Deferred Interrupts" sub-state 204c, in which all interrupts are serviced sequentially in order of priority. During interrupt processing, the EOI register 120 is used to indicate end-of-interrupt processing for each interrupt vector serviced. Once interrupt processing is complete, the Deferred_Interrupt_Pending flag 108 is set to FALSE and a transition 308 is made to a "Heavyweight Context Restore" sub-state 204d. Once context is restored, a transition 310 is made back to the Operating System Miscellaneous Activities state 200 responsive to a return from interrupt. Sub-states 204a–204d comprise substates of the Hardware Interrupt Context state 204 of FIG. 2.

From the Operating System Miscellaneous Activities state 200, a call is made to a Deferred Interrupt Poll routine at regular intervals. The frequency with which the Deferred Interrupt Poll routine is called exceeds the expiration time quantum for deferrable interrupts. This prevents subsequent interrupts that would normally have been deferred from taking transition 304 from state 202a as a result of the expiration of the time limit or quantum for servicing a previously deferred interrupt. A call to the Deferred Interrupt Poll routine causes a transition 312 to a "Mask All Processor Interrupts and Test the Deferred_Interrupt_Pending Flag" sub-state 202a. If it is determined that the Deferred_Interrupt_Pending flag 108 is set to TRUE, a transition 314 is made to a "Service All Non-Deferred and Deferred Interrupts" sub-state 202b, in which all interrupts are serviced sequentially in order of priority. During interrupt processing, the EOI register 120 is used to indicate end-of-interrupt processing for each interrupt vector serviced. Once all of the interrupts have been serviced, the Deferred_Interrupt_Pending flag 108 is set to FALSE and a transition 316 is made to an "Unmask Processor Interrupts" sub-state 202c. Returning to the sub-state 202a, if it is determined that the Deferred_Interrupt_Pending flag 108 is set to FALSE, a transition 318 is made directly to the Unmask Processor Interrupts sub-state 202c. From the Unmask Processor Interrupts sub-state 202c, a transition 320 is made back to the Operating System Miscellaneous Activities state 200 when the Deferred Interrupt Poll routine completes. Sub-states 202a–202c comprise sub-states of the Deferred Interrupt Poll routine state 202 of FIG. 2.

Figure 4:
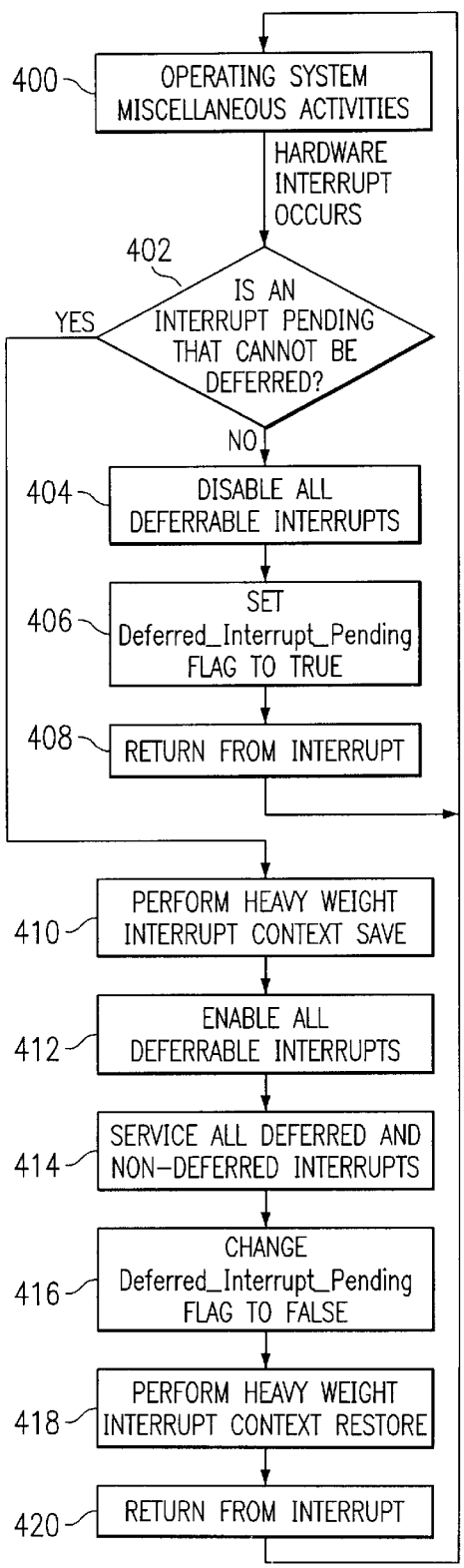
FIG. 4 is a flowchart illustrating the operation of a hardware interrupt context of a preferred embodiment of the invention.

Referring now to FIG. 4, operation of the Hardware Interrupt Context will be described in greater detail. Again, processing begins at an Operating System Process Time step 400. Responsive to receipt of a hardware interrupt, processing proceeds to step 402, in which a determination is made whether an interrupt is pending that cannot be deferred. In other words, a determination is made whether a non-deferrable interrupt is pending. In the preferred embodiment, this is accomplished by examining the four interrupt request registers IRR0–IRR3 128. For example, all external interrupts represented in IRR0 and IRR1 may have been designated deferrable. Therefore, any bit set in IRR2 or IRR3 indicates that a non-deferrable interrupt is pending. If all pending interrupts are deferrable, execution proceeds to step 404, in which all deferrable interrupts are disabled. In the preferred embodiment, this is accomplished by "masking" all deferrable interrupts using the TPR.mic register 114. Execution then proceeds to step 406, in which the Deferred_Interrupt_Pending flag 108 is set to TRUE. In step 408, a return from interrupt is executed, returning processing to step 400. As a result of steps 404–408, all subsequent deferrable interrupts will be held as pending at the CPU 104 and will not be serviced immediately.

Returning to step 402, if it is determined that there is an interrupt pending that cannot be deferred, execution proceeds to step 410, in which a heavyweight interrupt context save is performed. This step encompasses the context save that is typically necessary in connection with a hardware interrupt; i.e., saving the state of the registers to memory. Execution then proceeds to step 412, in which all deferrable interrupts are enabled. Specifically, at this point, all pending deferrable interrupts are unmasked, using the TPR.mic register 114, so that they can be serviced. In step 414, all non-deferred and deferred interrupts are serviced sequentially in order of priority. In step 416, the Deferred_Interrupt_Pending flag 108 is set to FALSE. In step 418, a heavyweight interrupt context restore is performed, resulting in the state of the registers being restored so that the processor can continue executing the interrupted process, and in step 420, a return from interrupt is executed, returning processing to step 400.

Comparing FIGS. 3 and 4, it will be recognized that steps 402–408 correspond to sub-state 204a; step 410 corresponds to sub-state 204b; steps 412–416 correspond to sub-state 204c; and step 418 corresponds to sub-state 204d.

Figure 5:
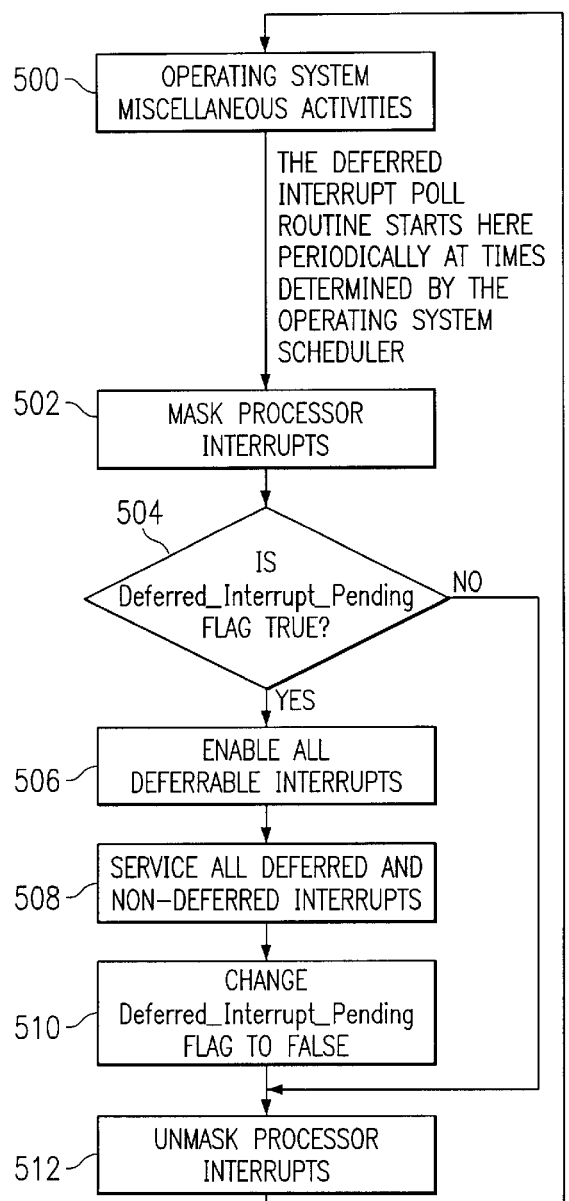
FIG. 5 is a flowchart illustrating the operation of a deferred interrupt poll routine of a preferred embodiment of the invention.

Referring now to FIG. 5, operation of the Deferred Interrupt Poll routine will be described in greater detail. Again, processing begins at an Operating System Process Time step 500. Responsive to a call to the Deferred Interrupt Poll routine, which occurs at regular time intervals, processing proceeds to step 502, in which all processor interrupts are masked at the CPU 104. This step can be accomplished using either the PSR.i register 112 or the TPR.mmi register 114. Step 502 is performed to prevent the state of the Deferred_Interrupt_Pending flag 108 from possibly changing state while it is being examined as described below. In step 504, a determination is made whether the Deferred_Interrupt_Pending flag 108 is set to TRUE. If so, indicating that there is at least one deferrable interrupt awaiting servicing, execution proceeds to step 506, in which all deferrable interrupts are enabled, or unmasked. In the preferred embodiment, this is accomplished by clearing the TPR.mic register 114. Execution then proceeds to step 508, in which all non-deferred and deferred interrupts are serviced sequentially in order of priority. In the preferred embodiment, this is accomplished by reading the IVR register 116. In step 510, the Deferred_Interrupt_Pending flag 108 is set to FALSE, indicating that there are no deferrable interrupts awaiting servicing. In step 512, the processor interrupts, which were masked in step 502, are unmasked, as the state of the Deferred_Interrupt_Pending flag 108 is now free to change. Returning to step 504, if it is determined that the Deferred_Interrupt_Pending flag is not TRUE (i.e., it is FALSE), indicating that there are no deferred interrupts pending, execution proceeds directly to step 512. Upon completion of step 512, execution returns to step 500.

Comparing FIGS. 3 and 5, it will be recognized that steps 502 and 504 correspond to the sub-state 202a; steps 506–510 correspond to sub-state 202b; and step 512 corresponds to substate 202c.

As previously indicated, although a preferred embodiment of the invention has been described with reference to the IA-64 architecture, it is not necessary that this particular architecture be employed to implement the invention. All that is required is hardware support for several activities, including (1) masking and unmasking, at the processor, all interrupts; (2) masking an unmasking specific interrupt vectors to create a distinction between deferrable and non-deferrable interrupts; (3) detecting of pending interrupts within those classes of deferrable and non-deferrable interrupts; (4) the ability to so service hardware interrupts without the traditional hardware interrupt context save and restore; (5) the ability to defer and culminate interrupt processing in a hardware state outside the processor's formal interrupt state, commonly referred to as "interrupt time;" and (6) supporting the notion of a lightweight interrupt so that full context save is not absolutely required to perform minimal operations, such as setting the Deferred_Interrupt_Pending flag 108 and masking deferrable interrupt vectors. As it were, the IA-64 architecture provides hardware support for each of the above-noted activities; however, it is anticipated that other processor architectures, both current and future, will also support these activities in some form or fashion.

Moreover, it is not necessary that the above-noted activities be supported in exactly the manner described herein. For example, the Deferred_Interrupt_Pending flag 108 could always be set to TRUE and never changed and all deferrable interrupts could always be masked except when being serviced as a result of a call to the deferred interrupt poll routine or as a result of the occurrence of a non-deferred "heavyweight interrupt." It is also anticipated that a "lightweight interrupt" could be effected using commonly available "scratch registers," rather than special banked registers designed for that purpose. For "lightweight interrupt" processing, all that is needed is that the processor architecture not "force" heavyweight interrupts and that there be sufficient space for a small amount of work to be performed in the context of an interrupt without requiring context to be saved.

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of servicing interrupts in a computer system comprising a processor and a device connected to the processor, the device generating an interrupt to the CPU when the device requires attention by the processor, the method comprising:

responsive to receipt of an interrupt from the device, determining whether the received interrupt is deferrable or non-deferrable; and responsive to a determination that the received interrupt is deferrable;

masking all deferrable interrupts at the processor;

setting a state of a Deferred_Interrupt_Pending flag to true; and returning from the interrupt without servicing the received interrupt, wherein the masking and setting are performed during a light-weight interrupt in which a context save is not performed.

2. The method of claim 1 further comprising periodically:

disabling all interrupts at the processor; and examining the state of the Deferred_Interrupt_Pending flag.

3. The method of claim 2 further comprising, if the state of the Deferred_Interrupt_Pending flag is true:
   unmasking all pending interrupts; and
   servicing all pending interrupts sequentially in order of priority.

4. The method of claim 3 further comprising setting the state of the Deferred_Interrupt_Pending flag to false.

5. The method of claim 1 further comprising, responsive to a determination that the received interrupt is non-deferrable:
   performing a context save;
   unmasking all pending interrupts; and
   servicing all pending interrupts, including the received interrupt, sequentially in order of priority.

6. The method of claim 5 further comprising:
   restoring context;
   setting the state of the Deferred_Interrupt_Pending flag to false; and
   returning from the interrupt.

7. The method of claim 2 wherein the disabling and examining occurs during execution of a deferred interrupt poll routine.

8. The method of claim 1 further comprising periodically calling a deferred interrupt poll routine, the deferred interrupt poll routine disabling all interrupts at the processor and examining the state of the Deferred_Interrupt_Pending flag, wherein if the state of the Deferred_Interrupt_Pending flag is true, the deferred interrupt poll routine unmasks all pending interrupts, services all pending interrupts sequentially in order of priority; and sets the state of the Deferred_Interrupt_Pending flag to false.

9. Apparatus for servicing interrupts in a computer system comprising a processor and a device connected to the processor, the device generating an interrupt to the CPU when the device requires attention by the processor, the apparatus comprising:
   means responsive to receipt of an interrupt from the device for determining whether the received interrupt is deferrable or non-deferrable;
   means responsive to a determination that the received interrupt is deferrable for masking all deferrable interrupts at the processor, setting a state of a deferred_Interrupt_Pending flag to true, and returning from the interrupt without servicing the received interrupt, and
   means for performing the masking and setting during a light-weight interrupt in which a context save is not performed.

10. The apparatus of claim 9 further comprising means for periodically disabling all interrupts at the processor and examining the state of the Deferred_Interrupt_Pending flag.

11. The apparatus of claim 10 further comprising means for unmasking all pending interrupts, servicing all pending interrupts sequentially in order of priority, and setting the state of the deferred interrupt flag to false if the state of the Deferred_Interrupt_Pending flag is true.

12. The apparatus of claim 9 further comprising means responsive to a determination that the received interrupt is non-deferrable for performing a context save, unmasking all pending interrupts, servicing all pending interrupts, including the received interrupt, sequentially in order of priority, restoring context, setting the state of the Deferred_Interrupt_Pending flag to false, and return from the interrupt.

13. The apparatus of claim 10 wherein the means for disabling and examining comprises a deferred interrupt poll routine.

14. The apparatus of claim 9 further comprising means for periodically calling a deferred interrupt poll routine, wherein the deferred interrupt poll routine disables all interrupts at the processor and examines the state of the Deferred_Interrupt_Pending flag, wherein if the state of the Deferred_Interrupt_Pending flag is true, the deferred interrupt poll routine unmasks all pending interrupts, services all pending interrupts sequentially in order of priority; and sets the state of the Deferred_Interrupt_Pending flag to false.

15. A method of servicing interrupts in a computer system comprising a processor and device connected to the processor, the device generating an interrupt to the CPU when the device requires attention by the processor, the method comprising:
   responsive to a receipt of an interrupt from the device, determining whether the received interrupt is deferrable or non-deferrable;
   responsive to a determination that the received interrupt is deferrable;
   masking all deferrable interrupts at the processor, wherein the masking and setting are performed during a light-weight interrupt in which a context save is not performed;
   setting a state of a Deferred_Interrupt_Pending flag to true; and
   returning from the interrupt without servicing the received interrupt responsive to a determination that the received interrupt is non-deferrable;
   performing a context save;
   unmasking all pending interrupts; and
   servicing all pending interrupts, including the received interrupt, sequentially in order of priority.

16. The method of claim 15 further comprising periodically:
   disabling all interrupts at the processor;
   examining the state of the Deferred_Interrupt_Pending flag; and
   if the state of the Deferred_Interrupt_Pending flag is true;
   unmasking all pending interrupts;
   servicing all pending interrupts sequentially in order of priority;
   setting the state of the Deferred_Interrupt_Pending flag to false; and
   returning from the interrupt.

17. The method of claim 16 wherein the disabling and examining occurs during execution of a deferred interrupt poll routine.

18. The method of claim 15 further comprising periodically calling a deferred interrupt poll routine, the deferred interrupt poll routine disabling all interrupts at the processor and examining the state of the Deferred_Interrupt_Pending flag, wherein if the state of the Deferred_Interrupt_Pending flag is true, the deferred interrupt poll routine unmasks all pending interrupts, services all pending interrupts sequentially in order of priority; and sets the state of the Deferred_Interrupt_Pending flag to false.

19. A method of servicing interrupts in a computer system comprising a processor and a device connected to the processor, the device generating an interrupt to the CPU when the device requires attention by the processor, the method comprising:
   masking all deferrable interrupts at the processor, wherein the masking is performed during a light-weight interrupt in which a context save is not performed;

responsive to receipt of a non-deferrable interrupt from the device;

performing a context save;

unmasking all pending interrupts;

servicing all pending interrupts, including the received interrupt, sequentially in order of priority;

restoring context; and returning from the interrupt.

20. The method of claim 19 further comprising periodically:

disabling all interrupts at the processor;

unmasking all pending interrupts; and servicing all pending interrupts sequentially in order of priority.

21. The method of claim 20 wherein the disabling and examining occurs during execution of a deferred interrupt poll routine.

22. The method of claim 19 further comprising periodically calling a deferred interrupt poll routine, the deferred interrupt poll routine disabling all interrupts at the processor, unmasking all pending interrupts, and servicing all pending interrupts sequentially in order of priority.

23. Apparatus for servicing interrupts in a computer system comprising a processor and a device connected to the processor, the device generating an interrupt to the CPU when the device requires attention by the processor, the apparatus comprising:

means for masking all deferrable interrupts at the processor, wherein the masking is performed during a light-weight interrupt in which a context save is not performed; and means responsive to receipt of a non-deferrable interrupt from the device for performing a context save, unmasking all pending interrupts, servicing all pending interrupts, including the received interrupt, sequentially in order of priority, restoring context and returning from the interrupt.

24. The apparatus of claim 23 further comprising means for periodically disabling all interrupts at the processor; unmasking all pending interrupts, and servicing all pending interrupts sequentially in order of priority.

25. The apparatus of claim 23 further comprising means for periodically calling a deferred interrupt poll routine, the deferred interrupt poll routine disabling all interrupts at the processor, unmasking all pending interrupts, and servicing all pending interrupts sequentially in order of priority.

* * * * *